UNITED STATES PATENT OFFICE.

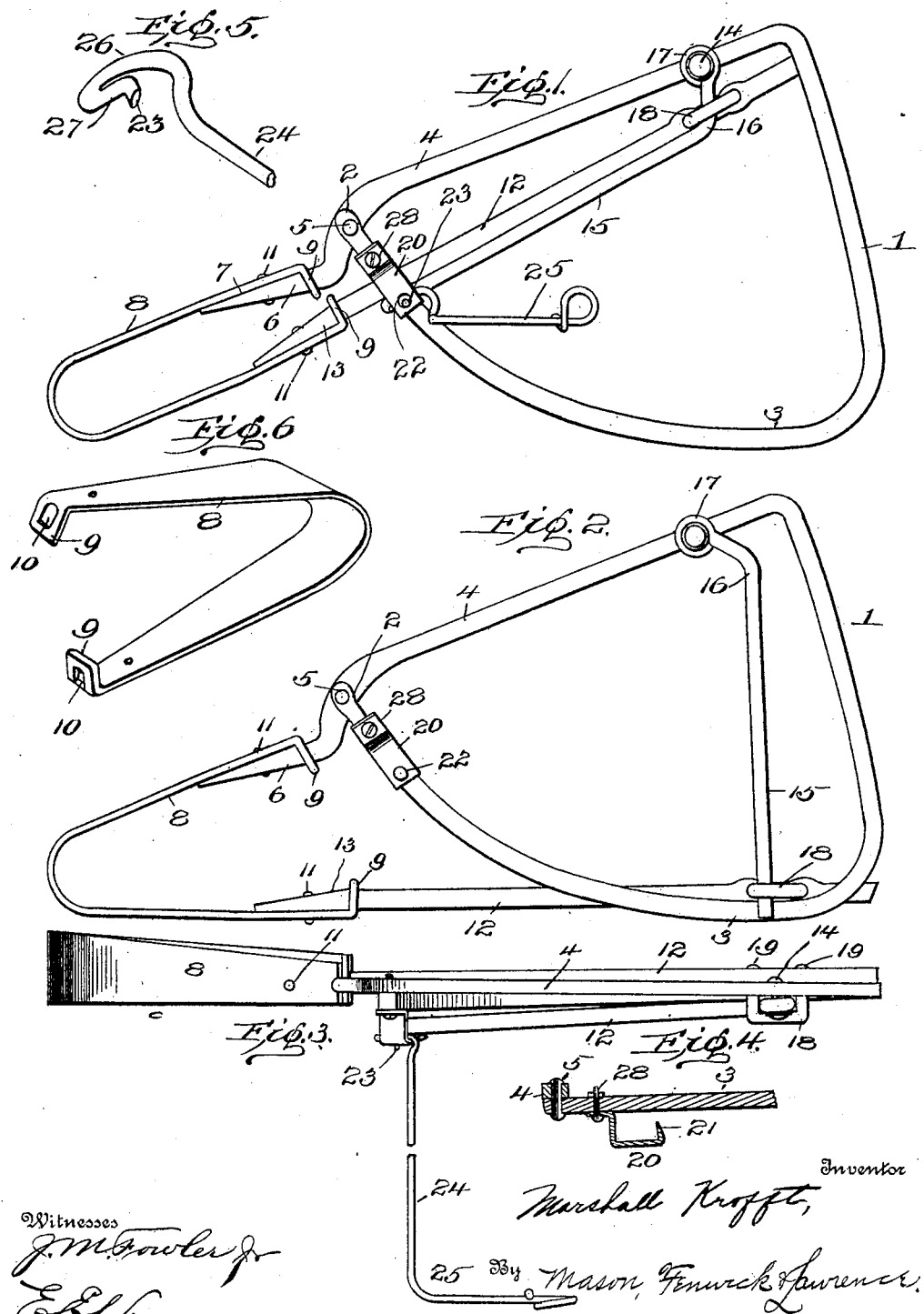

MARSHALL KROFFT, OF MEREDITH, NEW YORK.

ANIMAL-TRAP.

No. 823,126.　　　　Specification of Letters Patent.　　　　Patented June 12, 1906.

Application filed October 5, 1905. Serial No. 281,451.

*To all whom it may concern:*

Be it known that I, MARSHALL KROFFT, a citizen of the United States, residing at Meredith, in the county of Delaware and State of New York, have invented certain new and useful Improvements in Animal-Traps; and I do hereby declare the following to be a full, clear, and exact description of the invention, such as will enable others skilled in the art to which it appertains to make and use the same.

This invention relates to improvements in animal-traps.

The object of the invention is the provision of means for facilitating the ensnaring or trapping of an animal by employing a loop and means for compressing the animal within said loop.

With this and other objects in view the invention consists of certain other novel constructions, combinations, and arrangements of parts, as will be hereinafter fully described, illustrated in the accompanying drawings, and more particularly pointed out in the claims hereto appended.

In the drawings, Figure 1 is a top plan view of a trap constructed in accordance with the present invention, said trap being set, while Fig. 2 is a similar view of the trap in a "sprung" or unset condition. Fig. 3 is a side view of the device depicted in Fig. 1. Fig. 4 is a fragmentary longitudinal sectional view of the trap, showing the hook, which normally supports the trigger and one end of the latch when the trap is set, as depicted in Fig. 1. Fig. 5 is a fragmentary view of the trigger. Fig. 6 is a perspective view of the spring.

Referring to the drawings, 1 designates the looped member, which is formed, preferably, by bending a bar of metal and securing the end 2 of the bowed portion 3 to the upper or primary part 4 by any suitable means—as, for instance, a rivet or bolt 5. The end 6 of the looped member 1 is tapered throughout its length and is provided with a flat portion 7.

I employ a spring 8, which is preferably formed of a flat strip and is substantially U-shaped. Each end 9 of the spring 8 is bent at an angle to the body and is formed with a slot or aperture 10. The end 6 of the looped member 1 is positioned within one of the apertured ends of the spring 8, and the flat portion 7 of said end 6 bears against the spring, said spring being secured to the end 6 by any suitable means—as, for instance, rivet 11.

Within the other apertured end of the spring, a jaw or pressure-bar 12 is positioned. The jaw 12 is formed from a bar of metal, and its spring-engaging end 13 is similarly constructed to end 6 of the looped member 1. Said jaw 12 and spring 8 are preferably secured together by means of rivet 11. A peculiar advantage is obtained by forming the ends of the spring with apertured angular extensions, for the reason that when the single rivet is positioned as specified independent rotary movement of the spring and looped member or jaw and spring is prevented—that is to say, the apertured angular extensions of the spring obviate the necessity of employing a plurality of rivets or bolts for securing said spring in a fixed position upon the ends of the looped member and jaw.

A bolt or extension 14, constituting a projection, is carried by the upper portion 4 of the looped member 1. A latch 15 is pivotally mounted upon bolt 14. The latch 15 is bent intermediate its ends, as at 16. The latch is supported upon the bolt 14 by means of a loop 17, which is formed upon said latch. The latch 15 is positioned within an eye 18, formed upon the jaw 12. The eye 18 is preferably constructed by passing the ends of a substantially U-shaped member through the jaw 12 and securing said substantially U-shaped member by flattening the ends, as at 19, Fig. 3. A catch or hook 20 is fixedly secured to the bowed portion 3 of the looped member 1 contiguous to the end 2 of said member 1. The catch or hook is provided with a right-angled end 21, upon which the latch 15 is positioned when the trap is set. The angular catch or hook 20 is provided with an aperture 22, within which is positioned the end 23 of a trigger 24. The trigger is provided with a body portion having at one end a right-angled looped extension 25 and at its opposite end a substantially right-angled extension 26, provided with a portion 27, bent back upon the portion 26 and carrying end 23.

The catch or hook 20 is removably secured to the bowed portion 3 of the looped member 1, preferably by means of an ordinary bolt-and-nut structure 28.

When the trigger 24 is positioned upon the catch 20, Figs. 1 and 3, and the latch is also positioned upon said catch, a slight movement of the trigger will push said latch off of said catch or hook 20, and thereby permit of the jaw 12 through the action of the spring 8 to move downward. The movement of the jaw is limited through the medium of the substantially U-shaped member 18, constituting the eye. The member 18 constitutes a stop or projection. The jaw 12 and the latch 15 are positioned upon opposite sides of the bowed portion 3 of the looped member 1. If the trap is set and an animal springs the same by reaching through the looped member 1 and moves the trigger, that portion of the animal within the looped member will be compressed within the looped member not only by the jaw 12, but also the latch 15, as it will be obvious that as the jaw 12 swings downwardly the latch 15 will be pivoted rearward, thereby compressing or gripping the animal similar to a running-noose. When the trigger 24 is in position upon the catch 20, Fig. 3, it cannot rotate, owing to the formation of the right-angled end 23 centrally of the extension or portion 26, for it is obvious that the flat end 21 and the portion 26 extend parallel, and thereby prevent said movement. However, the trigger can be moved sufficiently to push off the latch 15, so as to allow the spring-actuated jaw 12 to move to its unset position, Fig. 2.

The spring 8 is formed from a flat resilient strip or sheet, while the looped member is formed from a bar of comparatively stiff material. Of course the difference in the material of the spring and looped member minimizes the expense of construction.

What I claim is—

1. An animal-trap, comprising a substantially U-shaped spring provided with apertured ends, a looped member positioned within one of the apertured ends of said spring, a single fastening means fixedly securing said spring and looped member together, a jaw positioned within the other apertured end of said spring, a single fastening means securing said jaw and spring in a fixed position, and means for sustaining said jaw at one side of said looped member and permitting said jaw to move to the opposite side of said looped member.

2. An animal-trap, comprising a looped member provided with a tapering end, a jaw provided with a tapering end, a flat, substantially U-shaped spring provided with apertured ends extending at an angle therefrom, the tapering ends of said looped member and jaw positioned within the apertured ends of said spring, means fixedly securing said spring upon the tapering ends of said looped member and jaw, a substantially U-shaped member carried by said jaw, a latch carried by said looped member and positioned within said substantially U-shaped member, a stationary catch carried by said looped member, said latch adapted to be positioned upon said catch for securing said jaw in a set position, and means for displacing said latch off of said catch for permitting said jaw to move from a set position.

3. An animal-trap, comprising a looped member, a jaw, a bowed spring fixedly secured to one end of said looped member and jaw, a stationary catch carried by said looped member, a latch carried by said looped member, a projection formed upon said jaw and engaging said latch, said jaw adapted to be held in a set position when said latch is positioned upon said catch, and means for removing said latch from off of said catch.

4. An animal-trap, comprising a looped member, a jaw, a spring connecting and surrounding one of the ends of said looped member and jaw, a removable, stationary catch provided with a right-angled extension formed upon its outer end, carried by said looped member, and means engaging said jaw and adapted to be positioned upon said catch for securing said jaw in a set position.

5. An animal-trap, comprising a looped member, a jaw, a spring fixedly secured to one of the ends of said looped member and jaw, a removable catch provided with an aperture, carried by said looped member, a projection formed upon said jaw, a latch carried by said looped member and engaging said projection, said latch adapted to engage said catch when said jaw is set, and means engaging the apertured portion of said catch and capable of being moved for displacing said latch and springing said jaw.

6. An animal-trap, comprising a looped member, a jaw, resilient means connecting said looped member and jaw, a latch carried by said looped member and coacting with said jaw for securing said jaw in a set position, and a trigger coacting with said latch for springing said jaw, said trigger comprising a body portion provided with a looped end, a substantially right-angled extension formed upon the opposite end of said trigger, said right-angled extension provided with a portion bent back upon itself and terminating in a substantially right-angled projection.

7. An animal-trap, comprising a flat, bowed spring, said spring provided with apertured, angular ends, a looped member, one end of said looped member positioned within one end of said spring, a jaw positioned within the other end of said spring, and means for securing said jaw in a set position and permitting said jaw to move from said position.

In testimony whereof I affix my signature in presence of two witnesses.

MARSHALL KROFFT.

Witnesses:
VIRGIL B. FORMAN,
ARTHUR K. BONTON.